United States Patent [19]

Petersen

[11] Patent Number: 5,430,584
[45] Date of Patent: Jul. 4, 1995

[54] DISK DRIVE INTERFACE COMBINING A MAGNETO-RESISTIVE READ AND INDUCTIVE WRITE CIRCUITS

[75] Inventor: Corey D. Petersen, Pleasanton, Calif.

[73] Assignee: International Microelectronic Products, San Jose, Calif.

[21] Appl. No.: 779,300

[22] Filed: Oct. 18, 1991

[51] Int. Cl.⁶ .......................... G11B 5/09; G11B 5/02
[52] U.S. Cl. .................... 360/78.04; 360/46; 360/68; 360/113
[58] Field of Search .............. 360/46, 66, 67, 68, 360/78.04, 113

[56] References Cited

U.S. PATENT DOCUMENTS

| | | | |
|---|---|---|---|
| 3,656,130 | 4/1972 | Bucklin, Jr. et al. | 360/78.04 |
| 3,911,484 | 10/1975 | Mutou et al. | 360/78.04 |
| 4,724,495 | 2/1988 | Hedberg et al. | 360/48 |
| 4,777,544 | 10/1988 | Brown et al. | 360/103 |
| 4,833,559 | 5/1989 | Belk | 360/113 |
| 5,122,915 | 6/1992 | Klein et al. | 360/113 |

*Primary Examiner*—Stuart S. Levy
*Assistant Examiner*—Tai V. Duong
*Attorney, Agent, or Firm*—Majestic, Parsons, Siebert & Hsue

[57] ABSTRACT

A single integrated circuit chip provides an interface to both magneto-resistive read elements and inductive write elements of a plurality of read/write heads of a disk drive mass data storage system. Separate multiplexers and current sources are used for the read and write channels. The read element of a head selected by one of the multiplexers is preamplified on the chip. A write driver circuit is also provided, being connected to a write element of a head selected by the other of the multiplexers.

4 Claims, 2 Drawing Sheets

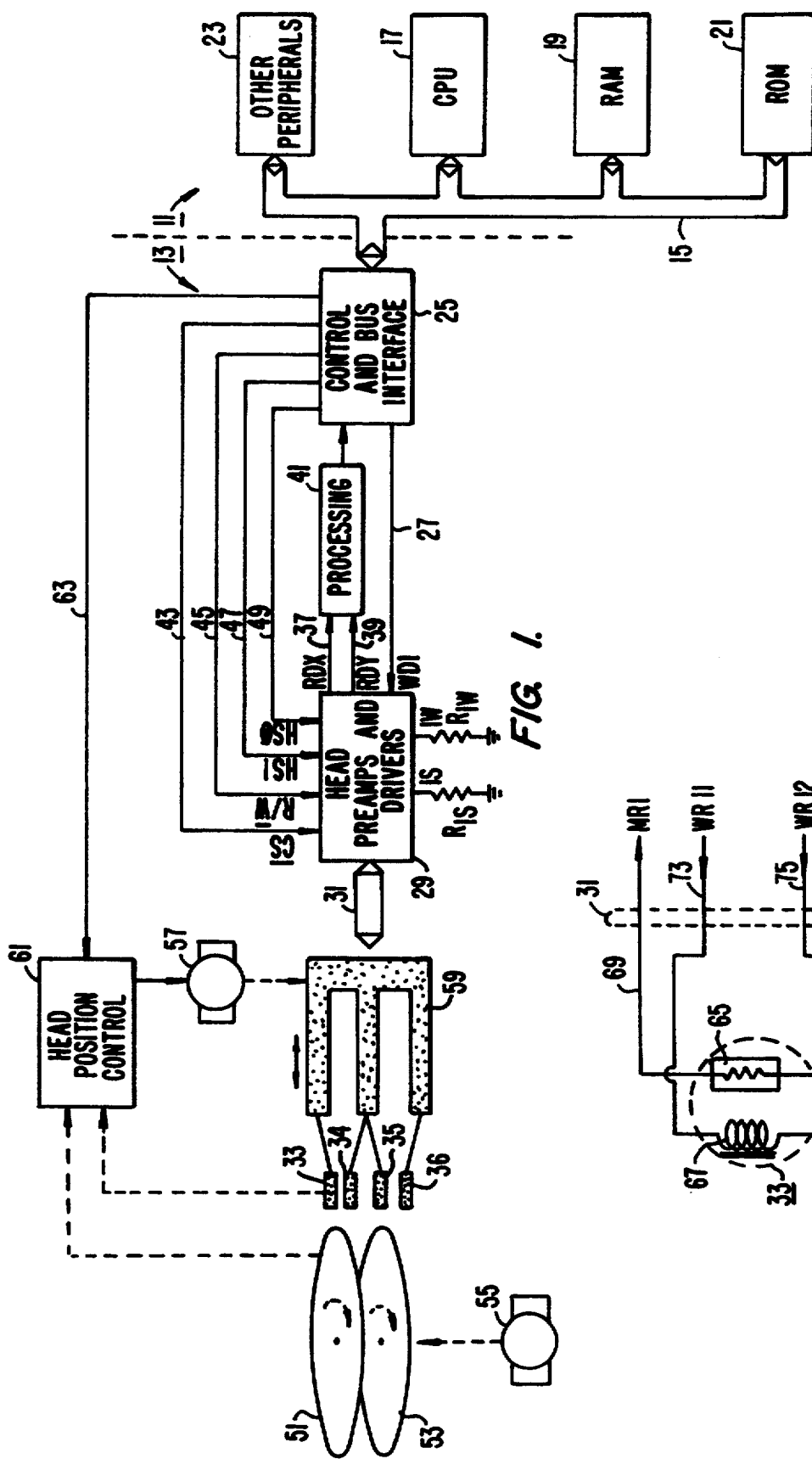

DISK DRIVE INTERFACE COMBINING A MAGNETO-RESISTIVE READ AND INDUCTIVE WRITE CIRCUITS

BACKGROUND OF THE INVENTION

This invention relates generally to disk drive types of mass data storage systems, and, more particularly, to circuits interfacing with read and write heads of such systems.

A disk drive storage system includes one or more rotating disks having magnetizable material coated on its surfaces. A read/write head is associated with each surface, all of the heads being moved together radially across the rotating disk surfaces to reach addressed data recording tracks. The most common type read/write head uses a single inductive element for both writing data onto the disk surface and reading data from it.

Currently, a different type of read/write head is being used to a limited extent and being contemplated for large scale use by disk drive manufacturers. This head includes separate read and write elements. The read element is a magneto-resistive type; that is, its resistance changes as a function of the magnetic field it which it is placed, and itself is non-magnetic. The write element is a magnetic thin film type. Movement toward use of this type of head is occurring because of its ability to read and write data at significantly higher densities on magnetic disk surfaces than possible with the popular single element head.

Circuits for interfacing with single element heads of the conventional type connect both a preamplifier read channel and a write driver through a common multiplexer (switch) that selects one of the heads at a time for connection with a disk controller. Since this is not suitable for the newer two-element heads, it is a primary object of the present invention to provide appropriate interface circuitry that allows the advantages of the newer heads to be fully utilized.

SUMMARY OF THE INVENTION

This and additional objects are accomplished by the present invention, wherein, briefly and generally, separate multiplexers are provided for the read and write channels and include connected thereto a preamplifier and write driver circuit, respectively. A current reference source is provided in the read channel for simultaneously biasing the preamplifier and the magneto-resistive read element to which the read multiplexer has connected the circuit. A separate current reference source is also desirably connected to the write driver. All of this interface circuit is preferably provided on a single integrated circuit chip, thereby to simply and economically provide an interface between data read and write channels of a system controller with separate read and write elements of two or more disk drive heads.

Additional objects, features and advantages of the present invention will become apparent from the following description of a preferred embodiment thereof, which description should be taken in conjunction with the accompanying drawings.

BRIEF DESCRIPTION OF THE DRAWINGS

FIG. 1 illustrates in block diagram of a computer system and the major components of its disk storage system that includes use of the present invention;

FIG. 2 schematically illustrates the electrical characteristics of the read/write heads used in the system of FIG. 1.

DESCRIPTION OF A PREFERRED EMBODIMENT

Figure 3:
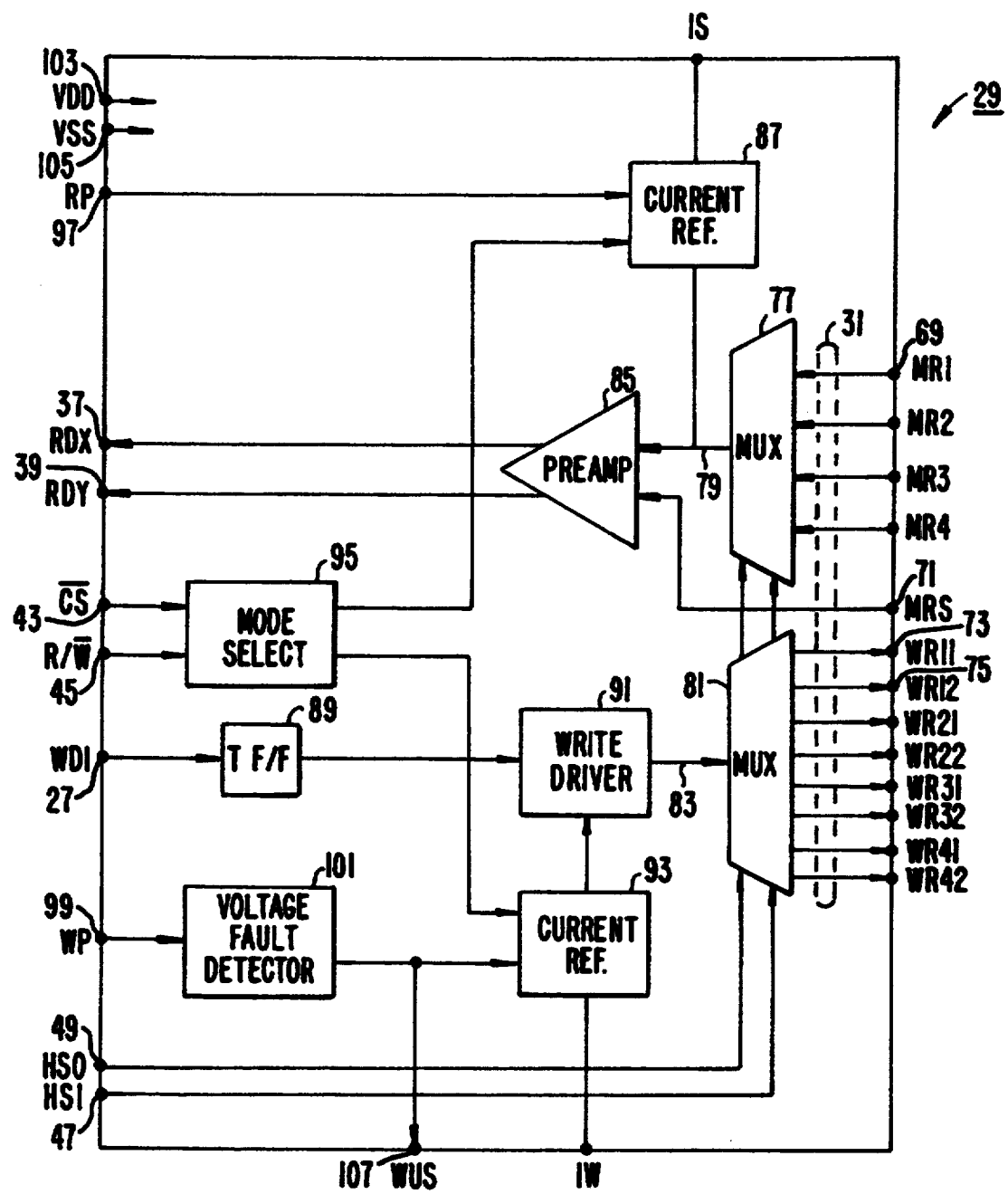
FIG. 3 is a block diagram of a single integrated circuit chip according to the present invention that is used in the disk storage system of FIG. 1.

Before describing the integrated circuit of the present invention, the computer and disk mass storage system in which it is used is first described with respect to FIG. 1. A computer system 11 includes a disk mass storage system 13 connected to a computer system bus 15. A microprocessor or other central processing unit (CPU) 17, random-access-memory (RAM) 19, and read-only-memory (ROM) 21 are also connected with a bus 15. Further, various peripherals, indicated at 23, in addition to the disk storage system 13, are likely provided as part of the computer system, those utilized depending upon the particular application of the computer system.

The disk storage system 13 includes circuits 25 that interface the storage system with the bus 15 and control operation of the storage system. Data to be stored is serially communicated over a line 27 to a circuit chip 29 that provides a data path through lines 31 to read/write heads 33, 34, 35 and 36. Data read by these heads is passed back through the circuits 31 and the interface chip 29. Its data output in lines 37 and 39 are appropriately processed by circuits 41 and then communicated with the controller and interface circuits 25 for use by the computer system. The processing circuits 41 usually include automatic gain control circuits, one or more filters, a pulse detector, a data separator circuit and the like, as normally utilized in disk storage systems. Operation of the interface chip 29 is controlled in part by the controller portion of the circuits 25 over control lines 43, 45, 47 and 49.

Mechanically, the disk storage system 13 includes two disks 51 and 53 that are rotated at a substantially uniform speed by an appropriate motor source 55. Each side of the disks 51 and 53 is coated with appropriate magnetizable material. The heads 33 and 34 work with the disk 51, the head 33 reading and writing data on its top surface and the head 34 reading and writing data on its bottom surface. Similarly, the heads 35 and 36 work with the top and bottom surfaces, respectfully, of the second disk 53. Although two disks are shown to be utilized, any number from one to many disks may be employed in order to provide the desired storage capacity. Although two read/write heads are generally used with each disk, one for each disk side, more than one head is sometimes used for each disk side. Further, although both sides of a disk is usually used, a magnetic recording-surface may be provided on only one side of a disk, thereby requiring only one head for that disk.

The read/write heads are moved radially across the surfaces of the disk by an actuator 57 that is mechanically coupled to a carriage 59 to which the heads 33–36 are attached. Operation of the actuator 57 is controlled by circuits 61 in response to control signals over a line 63 from the controller portion of the circuits 25. Such a mechanical position controller 61 generally also receives as an input, signals representative of the actual mechanical position of the head and rotatable position of the disk, as shown in dotted outline in FIG. 1.

Referring to FIG. 2, the electrical components of each of the heads 33–36 are shown by way of a specific example of the head 33. A magneto-resistive read element 65 and an inductive write element 67 are provided as part of each head to be very close to the spinning disk magnetic surface with which they are reading and writing data respectively. The magneto-resistive element 65 is connected with the interface chip 29 by a line 69 in a single-ended manner, an opposite side of the element 65 being connected to ground potential. A line 71 is also connected to a common ground point for the magneto-resistive elements for each of the heads 33–36. The inductive write element 67 is driven by a differential signal in lines 73 and 75 from the interface circuit chip 29.

The head interface integrated circuit chip 29 of FIG. 1 is best described with respect to its block diagram of FIG. 3. All of what is shown in FIG. 3 is included on a single integrated circuit chip. Its package pins that are connected with the various lines described with respect to FIGS. 1 and 2 are identified by the same reference numbers as those lines.

Two multiplexers are provided for connecting the circuits with one of the read/write heads 33–36 at a time. A multiplexer 77 switches between the magneto-resistive elements of each of the heads, connecting a selected one of them with an output line 79. Similarly, a second multiplexer 81 connects a driving signal in a line 83 with the inductive write element of one of the heads 33–36. The multiplexers 77 and 81 are controlled to connect with the appropriate head element by signals in lines 47 and 49 from the disk system controller. Although capacity for four heads is provided in the circuit being described, the same principles apply when being used with two or more heads. The multiplexers 77 and 81 are sized to switch among whatever number of pins are provided for connection with head read and write elements.

The single output 79 of the read multiplexer 77 is connected in a single-ended manner to an input of a preamplifier 85. An amplified differential signal is connected through two pins to the lines 37 and 39. A reference current source 87 is also connected with the line 79 and, as such, provides both a bias for the preamplifier 85 and a current source for operation of the magneto-resistive element to which the multiplexer 77 has connected the line 79. Additional details of the operation of the current source 87 with the preamplifier 85 and a connected magneto-resistive read element 65 had by reference to a co-pending application Ser. No. 07/588,637, filed Sep. 26, 1990, entitled "Low-Noise Preamplifier for Magneto-Resistive Heads", now U.S. Pat. No. 5,122,915, and naming Corey D. Petersen and Hans W. Klein as inventors.

For the write channel, data received over line 27 from the disk controller is connected to a T flip-flop circuit 89, whose output is connected to a write driving circuit 91. A reference current source 93, separate from the source 87 of the read channel, provides the current for the driver 91 to connect with the inductive write element 67 to which the driver output line 83 is connected through the multiplexer 81. The write driver 91 is preferably connected with a selected drive element 67 in a H-bridge configuration.

The constant current level of each of the sources 87 and 93 is adjustable by the user of the integrated circuit chip 29 through external connection of respective resistors $R_{IS}$ and $R_{IW}$ (FIG. 1) between respective terminals IS and IW and ground potential. Alternatively, the constant current source 87 could be replaced by a constant voltage source.

The disk storage systems in which the circuit of FIG. 3 is designed for use performs only a read or write operation at a given instant, and not both. Therefore, a logic circuit 95 is included on the circuit chip 29 control when the current sources 87 and 93 operate. Only in response to a chip select signal in line 43 is either of the current sources 87 or 83 allowed to turn on, and only one of them will be on at a time depending upon the state of the signal in read/write line 45. If the signal in line 45 requests a read operation, the logic 95 causes the current source 87 to be turned on while maintaining in an off condition the current source 93 of the write channel. Conversely, when a write operation is requested by an appropriate signal in the line 45, the logic 95 turns on the current source 93 while keeping the current source 87 in an off condition.

Other desirable features may optionally be provided as part of the same integrated circuit chip 29. A pin 97 can be used to allow the user to turn off the read current source 87 in response to some conditions external to the circuit 29, such as detection of a read/write head touching the disk surface. This then prevents current from flowing through the magneto-resistive element of that head since it may be short-circuited through the disk. This can prevent damage to the read element.

Similarly, the write current source 93 can be turned off in response to an appropriate signal at a terminal 99. This signal passes through a detector circuit 101 that is connected to power supply terminals 103 and 105 to detect when the voltage of the supply goes higher or lower than a preset tolerance. When this is detected, the write current source 93 is turned off and indication given by a signal at a terminal 107. The user can then monitor the terminal 107 to determine when the supply voltage exceeds certain predetermined limits. The signal can be used to provide automatic correction to the voltage supply or simply give and indication of the condition.

The integrated circuit chip 29 may be implemented by any of several known technologies or combinations thereof but it is preferably implemented entirely in complementary metal-oxide-silicon (CMOS) technology, including the reference current sources 87 and 93.

Although the present invention has been described with respect to a preferred embodiment thereof, it will be understood that the invention is entitled to protection within the full scope of the appended claims.

It is claimed:

1. An interface adapted to connect with a rotating magnetic data storage system having a plurality of heads that each includes a magneto-resistive read element and an inductive write element, comprising on a single integrated circuit chip:

a first multiplexer means connected to a plurality of input terminals to which the magneto-resistive read elements of the plurality of heads are individually connectable for connecting one of said input terminals to an output in response to a control signal, a preamplifier having an input connected to said first multiplexer output and an output connected to at least one read output terminal, means including an electrical source connected to said first multiplexer output for providing a bias to any magneto-resistive read element that is connected to one of said plurality of input terminals to which the first multiplexer is connected, a second multiplexer means having an input and a plurality of output terminals to which the inductive write elements of said plurality of heads are individually connectable for connecting said input to one of said output terminals in response to another control signal, a write driver circuit having an input connected to a write signal input terminal and an output connected to the second multiplexer input, an electrical current source connected to said write driver circuit for providing a current for said write driver circuit, and means responsive to a signal on one or more control pins for enabling operation of either a magneto-resistive read element or an inductive write element of a head selected by said first and second multiplexers but not both of said elements at one time.

2. An interface adapted to connect with a rotating magnetic data storage system having a plurality of heads that each includes a magneto-resistive read element and an inductive write element, comprising on a single integrated circuit chip:

a first multiplexer means connected to a plurality of single ended input terminals to which the magneto-resistive read elements of the plurality of heads are individually connectable for connecting one of said input terminals to an output, a preamplifier having an input connected to said first multiplexer output and a differential output connected to a pair of read output terminals, means including an electrical bias source connected to said first multiplexer output for providing a bias to both the preamplifier input and any magneto-resistive read element that is connected to one of said plurality of input terminals to which the first multiplexer is connected, a second multiplexer means having an input and a plurality of differential output terminal pairs to which the inductive write elements of said plurality of heads are individually connectable for connecting said input to one of said output terminal pairs, a write driver circuit having an input connected to a write signal input terminal and an output connected to the second multiplexer input, an electrical current source connected to said write driver circuit for providing a current for said write driver circuit, means responsive to signals on a first group of control pins for enabling either of the bias or current sources but not both at one time, and means responsive to signals on a second group of control pins for controlling said first and second multiplexers.

3. A computer storage system, comprising:

at least one rotating disk having magnetic surfaces on both sides thereof, a motor source connected to rotate said at least one disk, at least first and second heads that each includes a magneto-resistive read element and an inductive write element, means for moving said at least first and second heads radially across respective opposite sides of said at least one disk, a controller circuit characterized by providing head position control signals to said head moving means and a transfer of data through said at least two heads in response to commands and data transfer from a host computer system, and read and write electronic circuits provided on a single integrated circuit chip, including:

a first multiplexer means connected to the magneto-resistive read elements of the plurality of heads for connecting a magneto-resistive read element of a selected one of said at least first and second heads to an output, a preamplifier having an input connected to said first multiplexer output and an output connected to the controller through a pair of read output terminals, means including a single first electrical current source connected to said first multiplexer output for providing a bias to both the preamplifier input and any magneto-resistive read element to which said first multiplexer output is connected, a second multiplexer means having an input and connected to the inductive write elements of said plurality of heads for connecting said input to the inductive write element of a selected one of said at least first and second heads, a write driver circuit having an input connected to said controller through a write signal input terminal and an output connected to the second multiplexer input, a second electrical current source connected to said write driver circuit for providing a current for said write driver circuit, means responsive to signals from said controller on a first group of control pins for enabling either of the first or second current sources but not both at one time, and means responsive to signals from the controller on a second group of control pins for controlling said first and second multiplexers.

4. The system according to claim 3 which additionally comprises first and second resistors external of said circuit chip and connected respectively to said first and second current sources in a manner to control the level of current outputs from said sources.

* * * * *